United States Patent [19]

Fabre

[11] Patent Number: 4,829,220
[45] Date of Patent: May 9, 1989

[54] ELECTRIC FLIGHT CONTROL SYSTEM WITH AIRCRAFT INCIDENCE PROTECTION

[75] Inventor: Pierre Fabre, Toulouse, France

[73] Assignee: Aerospatiale Societe Nationale Industrielle, Paris, France

[21] Appl. No.: 96,481

[22] Filed: Sep. 15, 1987

[30] Foreign Application Priority Data

Sep. 15, 1986 [FR] France ................................ 86 12855

[51] Int. Cl.$^4$ .............................................. G05D 1/08
[52] U.S. Cl. ...................................... 318/584; 318/563; 318/648
[58] Field of Search ............... 318/580, 583, 584, 585, 318/586, 561–563, 638, 648, 652, 653; 244/175–178, 179–182

[56] References Cited

U.S. PATENT DOCUMENTS

| | | | |
|---|---|---|---|
| 3,393,380 | 3/1966 | Webb | 332/19 |
| 4,052,672 | 10/1977 | Enderby et al. | 325/147 |
| 4,110,707 | 8/1978 | Giolma et al. | 332/19 |
| 4,304,375 | 9/1980 | Builta et al. | 318/584 |
| 4,500,857 | 2/1985 | Bosselaers | 332/9 R |

*Primary Examiner*—William M. Shoop, Jr.
*Assistant Examiner*—David Martin
*Attorney, Agent, or Firm*—Fisher, Christen & Sabol

[57] ABSTRACT

An electric system for controlling a depth aerodynamic surface (1) of an aircraft. The system includes an attitude sensor (3) and an incidence sensor (6). A calculation means (7) in communication with the sensor controls a motor (4) so as the depth aerodynamic surface of the aircraft reaches an incidence according to a programmed depth control law. The system utilizes an incidence protection device (35) able to control the incidence of the aircraft within a range of values limited upwards by a limit value, beyond which the aircraft could become unstable.

4 Claims, 3 Drawing Sheets

ELECTRIC FLIGHT CONTROL SYSTEM WITH AIRCRAFT INCIDENCE PROTECTION

This invention concerns aircraft, especially modern transport planes fitted with an electric flight control system.

It is recognized that, as regards such aircraft, the attitude control orders given by the pilot(s) by means of control devices, such as, for example, mini-control columns, are transmitted to computers via attitude sensors, connected to the said control devices and generating electric signals representative of the position of the said control devices activated by the pilots. Thus, on incidence control, the position of such a control device is transformed by the said computers into an incidence value and the system controls the movement of the aircraft by means of depth control aerodynamic surfaces so that the actual incidence of the aircraft is equal to the value ordered by the pilot via the operation of the said control device.

The main aim of this invention is to protect such an aircraft against lift drops or other dangers by ensuring that the maximum incidence which the pilot is able to control remains less than an incidence value which is dangerous for the aircraft as regards the configuration occurring at the time the pilot is taking action. The system provided by the invention is operational, irrespective of the flight point of the aircraft (level, turning, slope) and the position of the throttle hand lever; especially when danger occurs, it turns to good account the fact that the application (manual or automatic) of the maximum thrust on the available engine(s) paired with the possibility of controlling a high incidence without any risk of disconnection is an effective means of combatting gradient wind speeds in critical flight phases, i.e. jet-assisted take-off and landing.

According to the invention, this aim is achieved via an electrical system for controlling an aircraft depth aerodynamic surface, such a system of this type including:

a control device activated by the pilot of the aircraft and connected to a first attitude sensor delivering an electric signal representative of the position of the said control device giving as a control point the desired incidence (Di) for the aircraft;

engine means for controlling the incidence of the said aerodynamic depth surface;

a second sensor connected to the aircraft and delivering an electric signal representative of the current actual incidence (I) of this aircraft; and calculation means mounted between the said first attitude sensor and the said engine and receiving the said signals delivered by the said first and second sensors and controlling the said engine so as to communicate to the said aerodynamic surface a movement so that the aircraft reaches an angle of incidence according to a programmed depth piloting law, the distinguishing features of such means being that it includes:

an incidence protection device able to control the incidence of the said aircraft within a value range limited by a limit value (IMR), beyond which the flight of the said aircraft could become dangerous;

controlled switching means enabling the said calculation means or the said protection device to be connected between the said first attitude sensor and the said engine means; and logical control means of the said switching means, such as:

firstly, at a given moment, the said protection device is connected between the said first attitude sensor and the said engine means solely when the actual incidence (I) of the aircraft is, at the said moment or at an immediately prior moment, greater than a threshold value (Ip) less than the said limit value (IMR) and, at the same time, when the position of the said control device occurs within the field of the incidences to be nosed up; and secondly, the said switching means take their position when the said calculation means are connected between the said first attitude sensor and the said engine means as soon as the position of the said control device occurs inside the field of incidences to be nose-dived.

Consequently, the protection device provided for by this invention is not continually active. On the contrary, it is only active when the incidence of the aircraft reaches a threshold value Ip selected at will according to each individual case. This threshold value Ip must not be too high so as to prohibit exceeding the lift drop incidence during sudden manoeuvres, but it must not be too low so that spurious releases do not impede normal attitude control Return to normal attitude control occurs via a simple logical condition translating a nose-dive request from the pilot.

Of course, the attitude control passage logic, together with the normal attitude incidence protection device, ensures not only the effecitve change of the attitude control law, but also the continuity of orders regarding the aerodynamic depth surfaces.

It will be observed that, when the incidence protection device is connected, the protection provided is unsurpassable: the incidence authority which the pilot possesses is then limited so that the aircraft may never reach a dangerous angle of incidence, yet still preserves adequate manoeuvrability.

Moreover, the system according to the invention is operational independently of the available thrust of the jet engines: it may thus be an advantage to couple it with an automatic gas replacement system and shall be controlled from an incidence control point value. Such an incidence control point shall be included in the range of incidence values in which the said protection device operates.

It will be easily understood that the system according to the invention enables the aircraft to be steady-state placed on a stable trajectory.

Another advantage of the device according to the invention is that the said logical control means include a first comparator able to compare the electric signal representative of the current actual incidence (I) of the aircraft and an electric signal representative of the said threshold value (Ip). a second comparator able to compare the electric signal (Id) representative of the position of the said control device and an electric signal (IN) representative of the boundary line between the fields of the incidences to be nosed up and nosedived, as well as a logical device receiving the output signals of the two comparators.

Such a logical device may be a binary sequential circuit comprising a control input, a priority reset input and a signal output, a circuit in which the output signal is only a logical I when the signal on the control input is a 1 and only when at the same time the signal on the reset input is 0 or, as a result on this state, the signal on the control input passes from 1 to 0.

Another advantage of this invention is that the said range of values whereby the said protection device controls the incidence of the aircraft has a lower limit than the said threshold value (Ip).

Thus, when the incidence protection device is on or connected, the pilot controls an incidence which is such that:

when the control stick is released and in the neutral position, its value is equal to (Ip), which determines the connection of the said protection device;

when the control stick is supported against the stop to be nosed up, its value is equal to the said upper limit value (IMR) less than any dangerous incidence, such as lift drop incidence, but greater than (Ip).

Consequently, according to the present invention, it is dangerous if the said incidence protection device includes a summing integrator for adding the said signal representative of the position of the said control device (Id) and means to control the said electric signal representative of the current actual incidence (I) to the sum of the signals thus obtained.

Preferably, prior to automatic control of the said electric signal representative of the current actual incidence (I) with the said sum of signals, the said signal is corrected so as to take account of anemometrical and gyrometrical information, such as, for example, the differential coefficient in relation to the elevation time of the aircraft or a speed derivative with respect to time. Thus, the controlled signal contains information which is characteristic of the long-duration movement of the aircraft: when the pilot changes instructions, the system according to the invention may thus generate a transient state which results in a steady state for which not only is the current actual value controlled by the instruction, but this also ensures that the speed and inclination angle are both constant. The system thus provides a significant degree of safety by preventing the aircraft from lift drop and by placing it on a constant trajectory.

The figures of the annexed drawing will reveal how the invention can best be embodied. On these figures, identical references designate similar elements.

Figure 3:
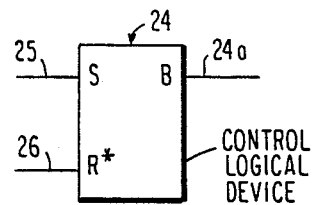
Figure 2:
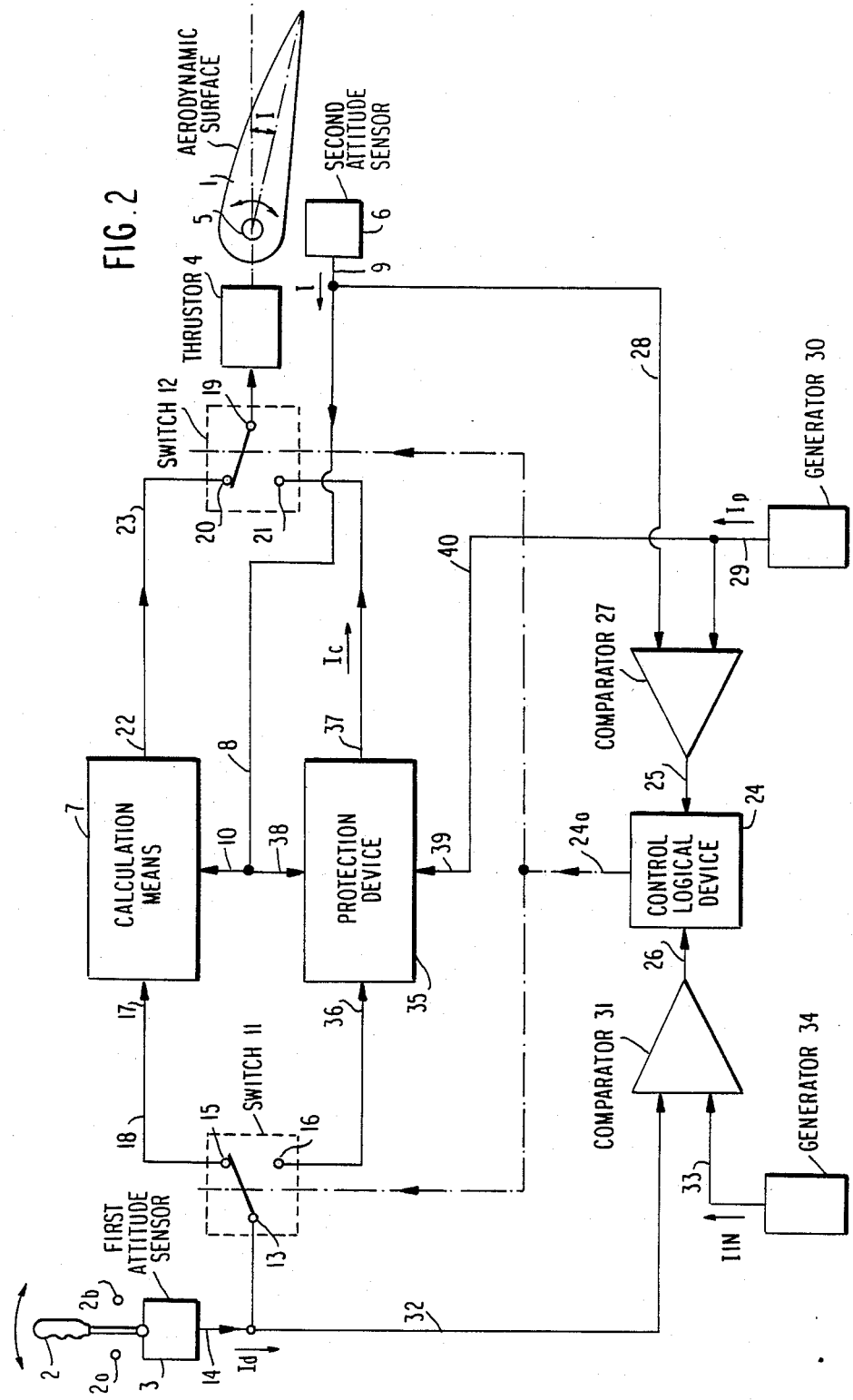
FIG. 2 shows the synoptic diagram of the system conforming to the present invention.

FIG. 3 diagrammatically illustrates one part of the control means of the switches of the system of FIG. 2.

Figure 4:
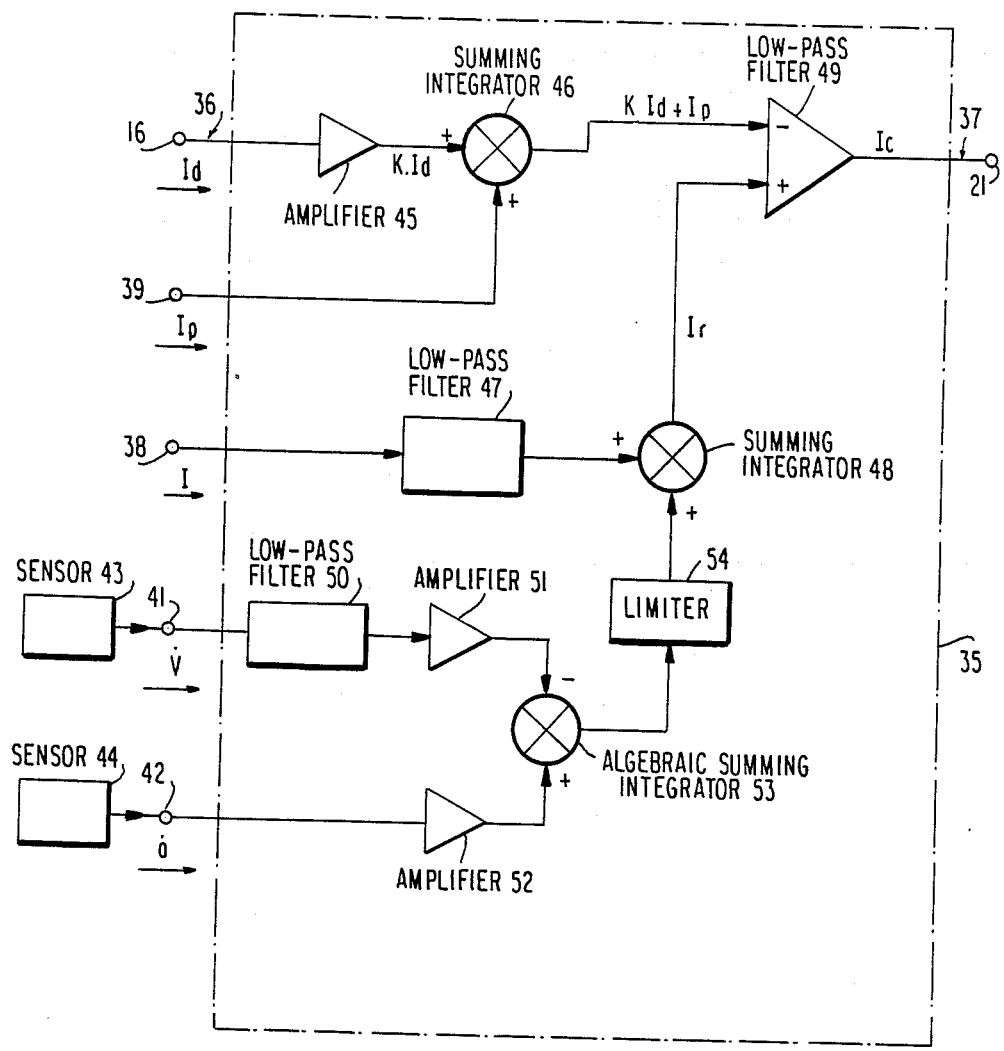

FIG. 4 is a synoptic diagram of the incidence protection device provided in the system of FIG. 2.

Figure 1:
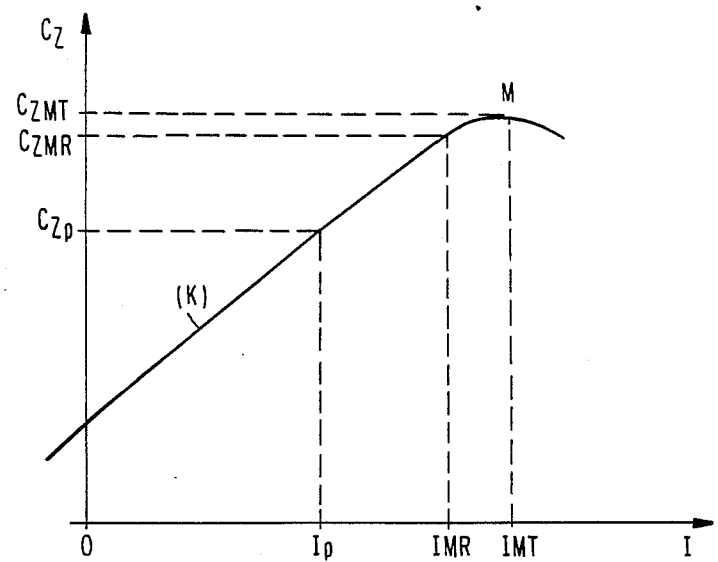
FIG. 1 is a diagram showing the lift of an aircraft according to the incidence of the pitch motivators of the said airplane.

It is recognized that, for a specific aircraft, if the lift (or lift coefficient CZ) is represented according to the incidence I of the said aircraft, a curve is obtained whose course is that of the curve (K) of FIG. 1. The lift increases almost in proportion to the incidence, but, for high incidence values, passes through a theoretical maximum CZMT (in M) corresponding to a theoretical maximum incidence value IMT. Of course, as the lift coefficient CZ decreases for incidences I greater than IMT, it is essential to limit incidence I to values less than IMT. Moreover, as regards a given aircraft, the curve (K) varies according to a large number of parameters (such as the Mach number, speed, aircraft configuration, application of air brakes, etc); thus, it is advisable to limit the actual maximum incidence able to be given to the said aircraft at an IMR value less than IMT so as not to risk entering into a decreasing lift zone, which could constitute a danger for the aircraft as this might result in lift drop or even buffettings or pitch vibrations. Thus, it is an advantage for the actual maximum lift to be limited to the CZMR value.

According to the invention, an automatic system is provided enabling the actual incidence of the aircraft to be limited to the IMR value as soon as this incidence exceeds crossing a threshold value, or the protection value Ip, less than IMR and corresponding to a lift CZp.

In the developments described hereafter, the electric signals representative of the various incidences are designated by the same references (I, Ip, Id, etc) as these.

The system according to the invention, shown diagrammatically on figure 2, is designed to control an aerodynamic surface 1 depth controlling the attitude control of an aircraft (not represented). This system includes:

a control device 2, such as a control stick able to be activated between a nosediving stop 2a and a nosing up stop 2b by the pilot or copilot of the aircraft and connected to a first attitude sensor 3, for example of the potentiometric type, delivering an electric signal representative of the position of the said control device 2, i.e. of an incidence Id, desired by the said pilot for the aircraft 1;

a motor or thrustor 4 designed to control the said aerodynamic surface 1 so as to have it rotate around its hinge pin on the said aircraft and vary the actual incidence I of the said aircraft 1;

a second attitude sensor 6 connected to the said aircraft 1 and delivering an electric signal representative of the actual incidence I of the latter; and calculation means 7 needing to receive the signals of the said first and second attitude sensors 3 and 6 and designed to control a motor or thrustor 4 so as to communicate to the said aerodynamic surface 1 a movement so that the aircraft reaches an incidence according to a desired programmed depth attitude control law for the said aircraft and, for example, stored in the said calculation means 7.

A direct link 8 connects the output 9 of the second attitude sensor 6 to the corresponding input 10 of the calculation means 7. Conversely, switches 11 and 12 are respectively interposed between the first attitude sensor 3 and the calculation means 7 first of all and secondly between the calculation means 7 and the motor or thrustor 4. It goes without saying that, although represented in the form of mobile device switches to fully explain them, the said switches 11 and 12 may be of the static type.

The switch 11 includes a common input 13 connected to the output 14 of the first attitude sensor 3 and two outputs 15 and 16 able to alternately be connected to the said common input 13. The output 15 of the switch 11 is connected to the corresponding input 17 of the calculation means 7 by a link 18.

The switch 12 includes a common output 19 connected to the motor or thrustor 4 and two inputs 20 and 21 able to alternately be connected to the said common output 19. The input 20 of the switch 12 is connected to the corresponding output 22 of the calculation means 7 by a link 23.

The control of switches 11 and 12 is coupled and effected via a control logical device with two inputs 25 and 26 which imposes:

either a first position (represented on FIG. 2) for which the switch 11 establishes the link between its input 13 and its output 15, whilst the switch 12 establishes the link between its input 20 and its output 19;

or a second position for which the switch 11 establishes the link between its input 13 and its output 16, whilst the switch 12 establishes the link between its input 21 and its output 19.

The input 25 of the control logical device 24 is connected to the output of a comparator 27, one of whose inputs is connected to the output 9 of the second attitude sensor 6 via a link 28, its other input being connected to the output 29 of a generator 30.

The generator 30, for example of the potentiometric type, transmits at its output 29 an electric signal representative of the incidence threshold Ip mentioned earlier and from which functions the automatic incidence protection as per the invention. Thus, through its input 25, the control logical device 24 known the result of the comparison between the current actual incidence I of the aircraft 1 and the said incidence threshold Ip.

The input 26 of the control logical device 24 is connected to the output of a comparator 31, one of whose inputs is connected to the output 14 of the first attitude sensor 3 via a link 32, its other input being connected to the output 33 of a generator 34.

The generator 34, for example a simple link to the ground, transmits at its output 33 an electric signal representative of the neutral value IN, for example the value nil, of the desired incidence Id separating the two fields of incidence in which the said aircraft is respectively ordered to nosedive (Id−Ip<0) and nose up (Id−Ip>0). Thus, through its input 26, the control logical device 24 known the result of the comparison between the current desired incidence Id required by the sleeve 2 and the said neutral value IN.

The output 24a of the control logical device 24 causes the switches 11 and 12:

(1) to systematically take their first position (link 13–15 and link 19–20), especially when the result of the comparison of Id and IN given by the comparator indicates that the current desired value of Id corresponds to a nosediving order, and more generally in all the cases not provided for under (2) as mentioned hereunder;

(2) to exceptionally take their seond position (link 13–16 and link 19–21) when the result of the comparison of I and Ip given by the comparator 30 indicates that the current actual value of the incidence of the aircraft exceeds the threshold value Ip and when at the same time the result of the comparison of Id and IN given by the comparator indicates that this is found in the field of the incidences to be nosed up. Moreover, the said switches 11 and 12 remain in this second position when, on the basis of the situation described above, the result of the comparison between I and Ip is inverted, whereas the result between Id and IN remains the same.

Furthermore, a protection device 35 conforming to the invention is provided between the switch 11 and the switch 12 and is designed to control the variation range of the incidence I between the values Ip and IMR. An example for embodying the protection device 35 is described on FIG. 4.

The input 36 and output 37 of the protection device 35 are respectively connected to the output 16 of the switch 11 and to the input 21 of the switch 12. Moreover, the said protection device 35 includes a second input 38 connected to the output 9 of the second attitude sensor 6 via the link 8. Thus, the protection device 35 recognizes the value I. The protection device 35 may also include a third input 39 connected to the output 29 of the generator 30 via a link 40 where the device needs to recognize the value Ip, as will be subsequently mentioned as per FIG. 4.

Quite simply, the said control logical device 24 can be embodied by an SRB type sequential circuit with priority resetting and whose control input S (set) is the input 25 and whose reset input R (reset) is the input 26. Such a sequential circuit is illustrated by FIG. 3.

Thus, if the logic level 1 is connected to the following events:

I greater than Ip,

Id greater than IN and the switches 11 and 12 are in their second position so that the protection device 35 is connected between the first attitude sensor 3 and the motor or thrustor 4, and if the logic level 0 is connected to each of the following events:

I less than Ip,

Id less than IN and the switches 11 and 12 are in their first position so that the calculation means 7 are connected between the first attitude sensor 3 and the motor or thrustor 4, then it can be seen that the said protection device 35 is only in service:

(a) when I is greater than Ip and at the same time Id is greater than IN;

(b) or even when I is less than Ip and Id is greater than IN, the previous state being that described in (a).

Thus, in other words, the protection device 35 is only in service when the incidence of the aircraft exceeds the protection incidence threshold and occurs within the incidence zone to be nosed up and this device 35 remains in this state when the incidence, although remaining in the zone of incidences to be nosed up, takes up a value less than the protection threshold after having exceeded the latter.

In all other cases, the protection device 35 is out of service and these are the calculation means 7 which impose the depth attitude control law.

The passage of the switches 11 and 12 from their second position to their first position occurs automatically as soon as Id becomes less than IN, i.e. as soon as the pilot orders nosediving.

In the mode of embodiment of the incidence protection device 35 as shown by FIG. 4, provision has been made to exploit gyrometric and anemometric information for effecting incidence control. Thus, as per the diagram of FIG. 2, this mode of embodiment includes two additional inputs 41 and 42 respectively connected to the output of sensors 43 and 44. For example, the sensor 43 delivers homogeneous information V to the derivative with respect to time concerning the horizontal speed of the aircraft, such information able to be the derivative of the flight speed, air speed, calibrated speed or even longitudinal load factor information or a mixture of such information. As for the sensor 44, this delivers homogeneous information a to the derivative with respect to time concerning the inclination angle of the aircraft.

Consequently, the information supplied to the protection device 35 is:

the desired incidence Id demanded by the pilot by operation of the stick 2 generated by the first attitude sensor 3 and available at the input 36 (terminal 16);

the protection triggering incidence threshold Ip originating from the generator 30 and available at the input 39;

the current actual incidence I of the aircraft and measured by the second attitude sensor 6 and available at the input 38;

the speed derivative information V supplied by the sensor 43 and available at the input 41 and the inclination angle derivative information a supplied by the sensor 44 and available at input 42.

The general principle concerning the mode of embodiment of FIG. 4 is the following:

The incidence signal Id is applied to an amplifier 45 whose grain K is such that, when the pilot has moved the control stick 2 until it is supported against the nosing up stop 2b, the maximum value K.IdM of the signal K.Id, having regard to subsequent processings of the said signal K.Id in the device 35, is limited so as to give incidence I of the aircraft the maximum value IMR without this possibly being exceeded. Thus, according to the action of the pilot on the control stick 2 within the field of incidences to be nosed up, the signal K.Id at the output of the amplifier 45 varies between 0 and K.IdM.

Downstream of the amplifier, a summing integrator 46 is disposed enabling the signal K.Id to be added up and also the signal Ip present at the input 39. The signal K.Id+Ip, depending on the action of the pilot on the control stick 2, thus varies from Ip to K.IdM+Ip.

Moreover, the current actual incidence signal I present at the input 38, after having passed into a low-pass filter 47 so as to eliminate the effect of turbulences, is addressed to a summing integrator 48 so as to be able to take into account, as shall be explained subsequently, the parameters V and a. At the output of the summing integrator 48, the signal I is thus mixed with information characteristic of the long-duration movement of the aircraft and this mixed signal is designated on FIG. 4 by Ir.

The signals K.Id+Ip and Ir, derived respectively from the summing integrators 46 and 48, are applied to the inputs of an integrator differential amplifier 49 delivered a control signal Ic at its output forming the output 37 of the protection device 35. The control signal Ic is sent to the motor or thrustor 4 through the switch 12, then in its second position. The signal Ic controls the motor or thrustor 4 until the incidence I of the aircraft reaches a value so that Ir has become equal to K.Id+Ip.

Thus, when Id is equal to IN, i.e. when the pilot releases the control stick 2 which automatically takes up its neutral position, the incidence I is controlled at the protection value Ip. On the other hand, when the control stick 2 is applied between the nosing up stop 2b, the incidence I is controlled at the IMR value being equal to KIdM+Ip.

As can be seen from FIG. 4, the signal V passes through a low-pass filter 50 designed to eliminate the effects of gusts and is amplified in an amplifier 51. Similarly, the signal a is amplified in an amplifier 52. These two amplified signals are mixed in an algebraic summing integrator 53 and are then set to a two-threshold limiter 54. This limiter 54 is of the type in which the output signal is:

equal to the input signal if the latter is between the two thresholds;

equal to the lower threshold if the input signal is less than the said lower threshold;

equal to the higher threshold if the input signal is greater than the said higher threshold.

The output signal of the limiter 54 is added to the signal I (filtered by the filter 47) in the summing integrator 48.

I claim:

1. Electric system for controlling an aircraft depth aerodynamic surface (1) of the type including:

a control device (2) activated by a pilot of the aircraft and a connected to a first attitude sensor (3) delivering an electric signal representative of the position of a control device instructing the desired incidence (Id) required for the aircraft;

motor means (4) for controlling the said depth aerodynamic surface (1);

a second sensor (6) connected to the aircraft and delivering an electric signal representative of the current actual incidence (I) of said aircraft and calculation means (7) mounted between said first attitude sensor (3) and said motor (4) receiving said signals delivered by the said first and second sensors (3,6) and controlling said motor (4) so as to communicate to said aerodynamic surface (1) a movement so that the aircraft reaches an incidence according to a programmed depth attitude control law, characterized in that it includes:

an incidence protection device (35) capable of controlling the incidence of said aircraft within a range of values limited upwards by a limit value (IMR), beyond which the flight of said aircraft could become dangerous;

controlled switching means (11,12) enabling connection to take place between said first attitude sensor (3) and said motor means (4) of either said calculation means (7) or said protection device (35); and logic control means (24 to 34) of said switching means (11,12), said logic control means (24 to 34) including a first comparator (27) able to compare the electric signal representative of the current actual incidence (I) of the aircraft and an electric signal representative of a threshold value (Ip), a second comparator (31) able to compare the electric signal (Id) representative of the position of said control device and an electric signal (IN) representative of the boundary between the fields of incidences to be nosed up and nosedived, together with a logic device (24) receiving the output signals of the two comparators (27,31), so that:

firstly, at a given instant, said protection device (35) is on circuit or connected between said first attitude sensor (3) and said motor means (4) only when the actual incidence (I) of the aircraft is at said instant or at an immediately prior instant, greater than the threshold value (Ip) less than said limit value (IMR) and when, at the same time, the position of said control device (2) occurs within the field of incidences to be nosed up (Id−Ip>0) and secondly, said switching means (11,12) take their position so that said calculation means (7) are in circuit between said first attitude sensor (3) and said motor means (4) as soon as the position of said control device (2) occurs within the field of incidences to be nosedived (Id−IP<0).

2. System according to claim 1 characterized in that said logic device (24) is a binary sequential circuit including a control input, a priority reset input and a single output, a circuit in which the output signal is only a logic 1 when the signal on the control input is a 1 and, at the same time, the signal on the reset input is 0 or, as a result of this state, the signal on the control input passes from 1 to 0.

3. Electric system for controlling an aircraft depth aerodynamic surface (1) of the type including:
- a control device (2) activated by a pilot of the aircraft and connected to a first attitude sensor (3) delivering an electric signal representative of the position of said control device instructing the desired incidence (Id) required to the aircraft;
- motor means (4) for controlling said depth aerodynamic surface (1);
- a second sensor (6) connected to the aircraft and delivering an electrtic signal representative of the current actual incidence (I) of said aircraft and
- calculation means (7) mounted between said first attitude sensor (3) and said motor (4) receiving said signals delivered by said first and second sensors (3,6) and controlling said motor (4) so as to communicate to said aerodynamic surface (1) a movement so that the aircraft reaches an incidence according to a programmed depth attitude control law, characterized in that it includes:
- an incidence protection device (35) capable of controlling the incidence of said aircraft within a range of values limited upwards by a limit value (IMR), beyond which the flight of said aircraft could become dangerous, said range of values whereby said protection device (35) controls the incidence of the aircraft and has, as a lower limit, said threshold value (Ip), and said incidence protection device (35) including a summing integrator (46) for adding said signal representative of said threshold value (Ip) to the signal (Id) representative of the position of said control device (2) and means (49) to control said electric signal representative of the current actual incidence (I) with the sum of the signals thus obtained;
- controlled switching means (11,12) enabling connection to take place between said first attitude sensor (3) and said motor means (4) of either said calculation means (7) or said protection device (35); and
- logic control means (24 to 34) of said switching means (11,12) so that;
- firstly, at a given instant, said protection device (35) is on circuit or connected between said first attitude sensor (3) and said motor means (4) only when the actual incidence (I) of the aircraft is, at said instant or at an immediately prior instant, greater than the threshold value (Ip) less than said limit value (IMR) and when, at the same time, the position of said control device (2) occurs within the field of incidences to be nosed up (Id−Ip>0) and
- secondly, said switching means (11,12) take their position so that said calculation means (7) are in circuit between said first attitude sensor (3) and said motor means (4) as soon as the position of said control device (2) occurs within the field of incidences to be nosedived (Id−Ip>0).

4. System according to claim 3 characterized in that, prior to controlling said electric signal representative of the current actual incidence (I) with said signals' sum, the said signal is corrected so as to take into account gyrometric and anemometric information.

* * * * *